(12) United States Patent
Mariani

(10) Patent No.: US 7,485,256 B2
(45) Date of Patent: Feb. 3, 2009

(54) METHOD OF FORMING SINTERED VALVE METAL MATERIAL

(75) Inventor: Robert Mariani, Douglassville, PA (US)

(73) Assignee: Cabot Corporation, Boston, MA (US)

( * ) Notice: Subject to any disclaimer, the term of this patent is extended or adjusted under 35 U.S.C. 154(b) by 451 days.

(21) Appl. No.: 10/828,789

(22) Filed: Apr. 21, 2004

(65) Prior Publication Data

US 2004/0216558 A1 Nov. 4, 2004

Related U.S. Application Data

(60) Provisional application No. 60/465,576, filed on Apr. 25, 2003.

(51) Int. Cl.
*B22F 3/11* (2006.01)

(52) U.S. Cl. ............................................. 419/2; 419/56

(58) Field of Classification Search .................. 419/57, 419/2; 361/528, 529; 11/529; 75/2, 56
See application file for complete search history.

(56) References Cited

U.S. PATENT DOCUMENTS

| | | | | |
|---|---|---|---|---|
| 2,675,310 A | * | 4/1954 | Hall | ............................. 419/57 |
| 3,540,663 A | * | 11/1970 | Dietz | ............................ 241/22 |
| 4,483,819 A | | 11/1984 | Albrecht et al. | |
| 4,720,300 A | * | 1/1988 | Nishizawa et al. | ............. 75/622 |
| 6,171,363 B1 | | 1/2001 | Shekhter et al. | |
| 6,174,493 B1 | * | 1/2001 | Asbury | ........................... 419/2 |
| 6,193,779 B1 | * | 2/2001 | Reichert et al. | ................ 75/343 |
| 6,323,055 B1 | | 11/2001 | Rosenberg et al. | ............. 438/77 |
| 6,348,113 B1 | | 2/2002 | Michaluk et al. | ............. 148/668 |
| 6,410,160 B1 | | 6/2002 | Landin et al. | |
| 7,204,866 B2 | * | 4/2007 | Oda et al. | ..................... 75/252 |
| 2002/0132388 A1 | | 9/2002 | Rosenberg et al. | |

FOREIGN PATENT DOCUMENTS

| | | |
|---|---|---|
| GB | 1 025 115 | 4/1966 |
| GB | 2 106 938 A | 4/1983 |
| JP | 54037009 | 3/1979 |
| JP | 60145304 | 7/1985 |
| JP | HEI 3-197640 | 8/1991 |
| JP | 3031474 B2 | 4/2000 |
| WO | WO 83/04381 | 12/1983 |
| WO | WO 01/82318 A2 | 11/2001 |
| WO | WO 02/092864 A2 | 11/2002 |

OTHER PUBLICATIONS

International Search Report and Written Opinion for PCT/US2004/012310 dated May 12, 2005.
Adelman, "Surfactant Aided Dispersion of Nanoparticular Suspension of Welding Fume." (no date).
West, "Solid State Chemistry and Its Applications," Wiley, New York, pp. 655-656 (1984).
German, "Sintering Theory and Practice," Wiley, New York, pp. 73-89 (1996).
Rolsten, "Iodide Metals and Metal Iodides," Wiley, New York, pp. 110-119 (1961).

* cited by examiner

*Primary Examiner*—Roy King
*Assistant Examiner*—Ngoclan T Mai

(57) ABSTRACT

Methods of forming sintered valve metal are described. The methods involve sintering a valve metal such as tantalum or niobium in the presence of an iodine source. The method optionally includes deoxidizing the metal using the same equipment used in sintering and/or as a combined step. The sintered valve metal formed by the methods of the present invention preferably has relatively large pores and other properties desirable for making capacitors that have high capacitance and low leakage.

29 Claims, 3 Drawing Sheets

Fig. 2. Evaporation-Condensation Mechanism. It is based on the equilibrium (forward and reverse) reaction: $Ta + 5/2\ I_2 = TaI_5$. The equilibrium coupled to the surface stress will drive the sintering reaction toward the right.

CONDENSATION:

$TaI_5\ (gas) \rightarrow TaI_5\ (surf.)$ $TaI_5\ (surf.) \rightarrow Ta + 5\ I\ (surf.)$

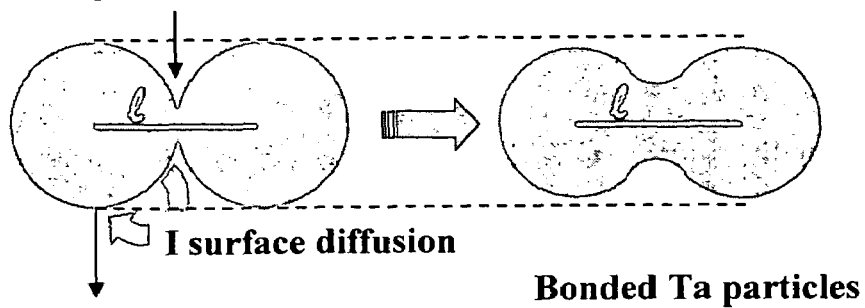

I surface diffusion

Bonded Ta particles

EVAPORATION:

$TaI_5\ (surf.) \rightarrow TaI_5\ (gas)$

METHOD OF FORMING SINTERED VALVE METAL MATERIAL

This application claims the benefit under 35 U.S.C. §119 (e) of prior U.S. Provisional Patent Application No. 60/465,576 filed Apr. 25, 2003, which is incorporated in its entirety by reference herein.

BACKGROUND OF THE INVENTION

The present invention relates to valve metals and electrolytic capacitors using the valve metals as well as methods of making the valve metals and the capacitors. More particularly, the present invention relates to sintered valve metal materials and sintered bodies such as capacitors having high capacitance made from the sintered valve metal material.

Capacitors in general, and valve metal capacitors in particular, have been a major contributor to the miniaturization of electronic circuitry. Valve metal capacitors typically are manufactured by compressing valve metal powder to form a pellet, sintering the pellet in a furnace to form a porous tantalum body (electrode), and then subjecting the porous body to anodization in a suitable electrolyte to form a continuous dielectric oxide film on the sintered body. Valve metal powder which is suitably employed in an anode electrode of a solid electrolytic capacitor may include, for example, powder of niobium, tantalum, titanium, tungsten, and/or molybdenum.

The performance characteristics of capacitors or electrodes formed from capacitor grade powders are expressed in terms of specific charge and electrical current leakage. The specific charge is a measure of electrical charge capacity of the capacitor and is usually proportional to the surface area of the powder as a sintered and anodized pellet. The electrical leakage is an indication of how well the capacitor holds the specific charge. Capacitors with improved electrical leakage characteristics are recognized as having higher reliability.

Development of valve metal powders suitable for making capacitors has resulted from efforts by both capacitor producers and valve metal processors to delineate the characteristics required for capacitor-grade powder for it to best serve in the production of quality capacitors. Such characteristics include specific surface area, purity, shrinkage, pressability, and the like. The powder preferably provides an adequate electrode surface area when formed into a porous body and sintered. The μFV/g of tantalum capacitors can be related to the specific surface area of the sintered porous body produced by sintering a valve metal powder pellet. The specific surface area of valve metal powder can be related to the maximum μFV/g attainable in the sintered porous body.

Purity of the powder is an important consideration. Metallic and non-metallic contamination tends to degrade the dielectric oxide film in valve metal capacitors. While high sintering temperatures serve to remove some volatile contaminants, high temperatures also tend to shrink the porous body, reducing its net specific surface area and thus the capacitance of the capacitor produced. Minimizing the loss of specific surface area under sintering conditions, i.e., minimizing shrinkage, is desirable to produce high μFV/g valve metal capacitors.

As noted, the μFV/g of a valve metal pellet can be affected by the specific surface area of the sintered powder. Greater net surface area can be achieved, of course, by increasing the quantity (grams) of powder per pellet; but, cost and size considerations have dictated that development be focused on means to increase the specific surface area of valve metal powder.

Sintering is the bonding of powder compacts by the application of heat to enable one or more of several mechanisms of atom movement that eliminate or reduce the number of contact interfaces between particles. The mechanisms that account for the sintering process are known and have been described, for example, in "Sintering Theory and Practice," R. M. German, J. Wiley and Sons, New York (1996), which is incorporated herein in its entirety by reference. The sintering mechanisms include viscous flow, liquid phase solution-precipitation, bulk diffusion, surface diffusion, and evaporation-condensation. Sintering mechanisms generally causes densification thus promoting shrinkage in the sintered body. However, it has been reported, for example in "Surfactant Aided Dispersion of Nanoparticular Suspension of Welding Fume," S. Adelman, at www.mit.edu/~sca23/simonadelman/surfactant.html, incorporated herein by reference, that the sintering mechanisms, surface diffusion and evaporation/condensation, do not lead to densification of the sintered material.

Sintering is typically carried out at high temperature (e.g., 1500-2000° C.) under vacuum. Sintering causes the individual powder particles to join together to form a porous structure. The structure is preferably of high mechanical strength and density, but is also preferably highly porous, exhibiting a large internal surface area. Sintered bodies that are subjected to sintering for excessive times or at high temperatures tend to form sintered material fused together too much, resulting in an anode formed therefrom having low specific surface area and low capacitance. Similarly, if the anodes are sintered for an insufficient time, or the furnace temperature is insufficiently low, the mechanical strength can be insufficient even though the capacitance is high.

Oxidation of valve metal material can occur at various stages in the production or processing of the valve metal material by various active or passive processes. For example, the valve metal can gain an oxide layer due to surface reaction with air under ambient or other conditions. The oxygen content of valve metal material can be controlled, for example, by deoxidizing the valve metal at one or more stages in its processing. The deoxidation is typically achieved by introducing an oxygen getter to the valve metal material. Conventionally, sintering and deoxidizing are achieved in separate steps, often using separate equipment. A substantial amount of time and money associated with the processing of the valve metal could be saved by combining the sintering and the deoxidizing steps.

Accordingly, a need exists for a method of sintering valve metals to preferably achieve coarsening without densification of the sintered valve metal material that provides for retention of pore volume and surface area, a limited extent to sintering, and an increase of compact or crushed strength. Additionally, a need exists for a method of sintering and deoxidizing a valve metal material in one combined step for use in forming a capacitor having high capacitance.

SUMMARY OF THE PRESENT INVENTION

It is therefore a feature of the present invention to provide a method for fine control of sintering processes for valve metal materials.

Another feature of the present invention is to provide a low temperature sintering method wherein the predominant sintering mechanisms are surface diffusion and/or evaporation-condensation.

A further feature of the present invention is to provide a method of sintering and deoxidizing a valve metal material in a combined step using substantially the same equipment.

Another further feature of the present invention is to provide a method of forming a sintering aid during the sintering process to facilitate sintering, as well as a method of collecting at least a portion of the sintering aid for reuse in further sintering processes.

Additional features and advantages of the present invention will be set forth in part in the description that follows.

To achieve these and other advantages, and in accordance with the purposes of the present invention, as embodied and broadly described herein, the present invention relates to a method of sintering a valve metal material in the presence of at least one iodine source to form a sintered valve metal material. The method optionally includes the formation of a valve metal-iodine compound.

The present invention further relates to a sintered valve metal material formed by the method of the present invention. The present invention also relates to a capacitor made from the sintered valve metal material.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF THE DRAWINGS

FIG. 2 is a schematic representation of the Evaporation-Condensation Mechanism for $TaI_5$.

DETAILED DESCRIPTION OF THE PRESENT INVENTION

Figure 1:
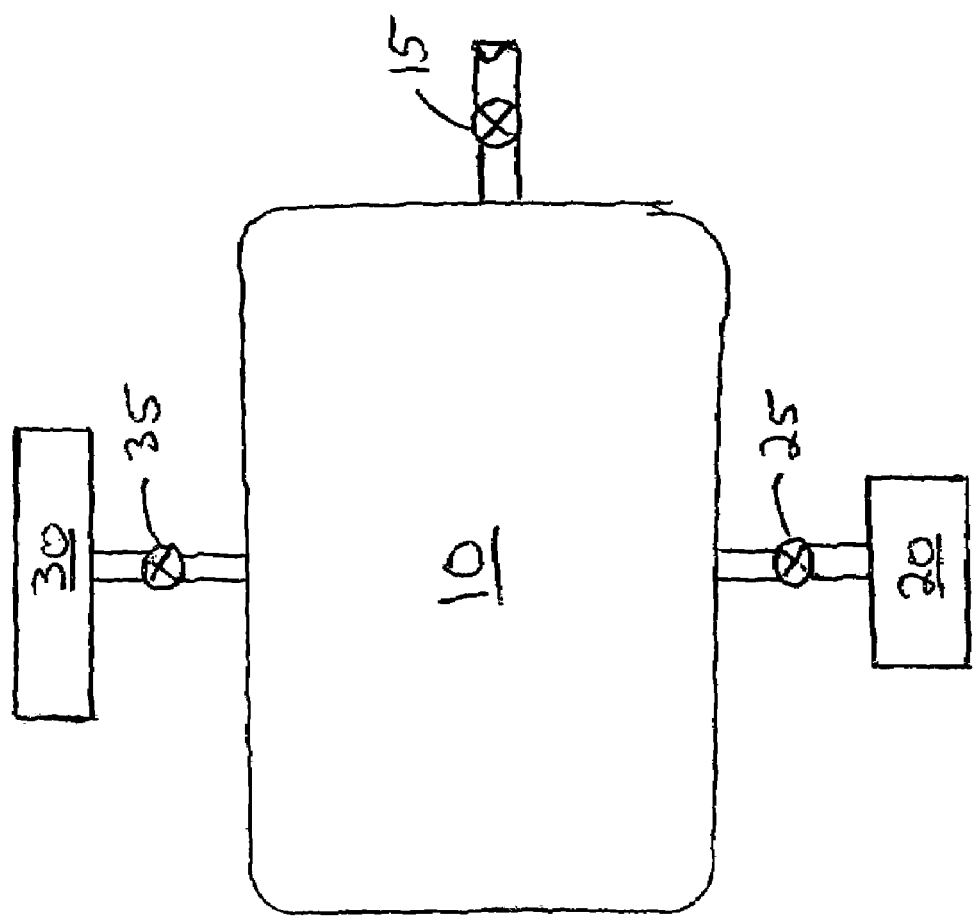
FIG. 1 is a schematic representation of an equipment configuration according to one embodiment of the present invention. Other equipment configurations are possible.
Figure 3:
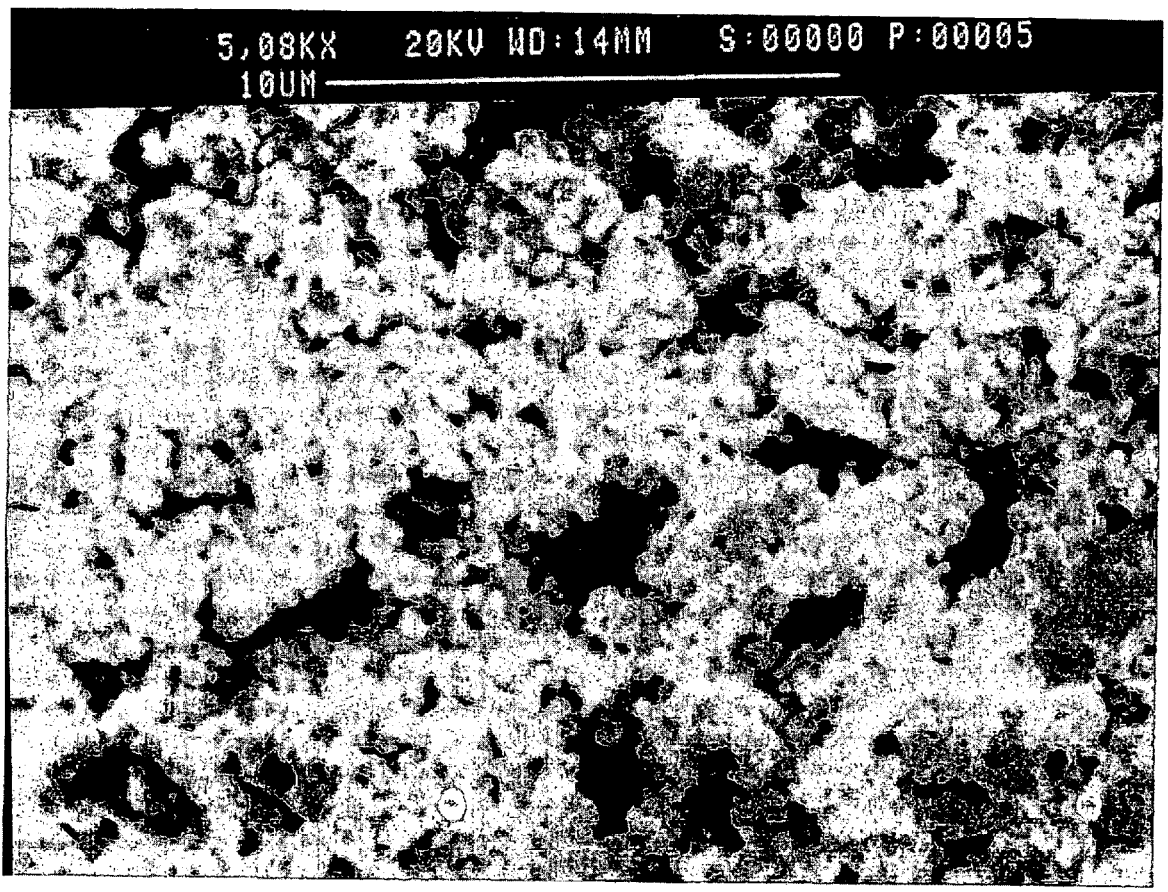
FIG. 3 is a SEM photo of a cross-section of a sintered anode made according to one embodiment of the present invention.

A method according to the present invention for forming a sintered valve metal material includes sintering a starting valve metal in the presence of at least one iodine source. The valve metal can include an oxide layer and the method of the present invention can include deoxidizing the valve metal in the presence of an oxygen getter before, during, and/or after the sintering of the valve metal.

For purposes of the present invention, the starting valve metal or base valve metal or valve metals generally include tantalum, niobium, and alloys thereof, and also may include metals of Groups IVB, VB, and VIB, and aluminum and copper, and alloys thereof. Valve metals are described, for example, by Diggle, in "Oxides and Oxide Films," Vol. 1, pp. 94-95, 1972, Marcel Dekker, Inc., New York, incorporated in its entirety by reference herein. Valve metals are generally extracted from their ores and formed into powders by processes that include chemical reduction, as described for example, in U.S. Pat. No. 6,348,113, by a primary metal processor. The valve metal used in the present invention can be formed by the chemical reduction, for instance, of potassium tantalum fluoride salt by metallic sodium, followed by treatment with acid, washing with water, and drying. The dried tantalum base material at this stage is generally referred to as sodium-reduced powder. In an alternative method, base materials are produced from an ingot, for instance, of tantalum by hydriding the ingot, and crushing the ingot into powder of desired sizes. The powder is further degassed in vacuum to remove hydrogen. The powder generated is generally referred to as ingot-derived powder. No matter the source, the valve metal powder can be any powder, such as particle, granule, fibrous, flake, angular, nodular, coral, and mixtures or variations thereof.

Examples of tantalum powders are described in U.S. Pat. Nos. 6,348,113 B1; 5,580,367; 5,580,516; 5,448,447; 5,261,942; 5,242,481; 5,211,741; 4,940,490; and 4,441,927, which are incorporated herein in their entireties by reference. Examples of niobium powders and other metal powders are described in U.S. Pat. Nos. 6,420,043 B1; 6,402,066 B1; 6,375,704 B1; 6,165,623; 5,306,462; 5,245,514; 5,217,526; 4,684,399; 4,555,268; and 3,779,717, which are incorporated herein in their entireties by reference.

Further metal refining techniques typically performed by a primary metal processor include thermally agglomerating the valve metal powder, deoxidizing the agglomerated valve metal powder in the presence of a getter material, and then leaching the deoxidized valve metal powder in an acid leached solution, as disclosed, for example, in U.S. Pat. No. 6,312,642, and 5,993,513, incorporated herein in their entireties by reference. The valve metal of the present invention can be powder that is agglomerated, non-agglomerated, or combinations thereof. For purposes of the present invention, valve metal can include all of the above-mentioned valve metal forms, including sodium-reduced, ingot-derived, flake morphologies, and fibrous powders, as well as pressed, anode, sintered, anodized, and capacitor bodies.

As to the oxide layer on the valve metal, the oxide layer can form at any point in the production or processing of the valve metal, and can be formed by any active or passive process. For example, the valve metal can gain an oxide layer due to surface reaction with air under ambient or other conditions. Tantalum, for example, rapidly forms a tantalum oxide layer, tantalum pentoxide for example, upon exposure to an oxygen environment. The oxygen content in the valve metal under this circumstance is proportional to the exposed surface area of the valve metal. The oxide layer can be a substantially continuous layer or a non-uniform or dispersed layer. The oxide layer can be located on the surface of the valve metal or diffused within the valve metal.

Sintering (or heat treating) of the starting valve metal can be achieved by subjecting the valve metal to heat-treating in any heat treatment device, a furnace or vacuum furnace, for example, suitable for the heat treatment of valve metals such as tantalum and niobium and others. For purposes of the present invention, sintering includes heat treatment. Sintering of the valve metal is at a sufficient temperature and at a sufficient time to form a sintered valve metal material. The sintering can be at any temperature which permits the sintering of the starting valve metal material and which is below the melting point of the valve metal material being sintered. Preferably, sintering is at a temperature in which the predominate sintering mechanisms activated are those that are believed not to remove matter from within the particles or to cause densification, such as surface diffusion and/or evaporation-condensation. Preferably, sintering is at a temperature in which sintering mechanisms that are believed to remove matter from within the particles or to cause densification, such as viscous flow, liquid phase solution-precipitation, bulk diffusion and the like, are slow so that the extent of their operation can be easily controlled by the duration of the sintering step. Preferably, sintering is at a temperature and for a duration in which the valve metal material will coarsen with little densification, and any densification that occurs can be optimized for processing and functional performance. Preferably, sintering is at a temperature in which the extent of sintering is readily controlled and/or limited to the initial stages. Preferably, sintering is at a temperature which yields a sintered valve metal material with an increase of or significant retention of pore volume and/or surface area, and with increased compact strength or crush strength.

Preferably, sintering is at a temperature of less than about 1200° C., and more preferably from about 350 to about 900° C., and most preferably from about 450 to about 850° C. Sintering is preferably conducted under vacuum or partial vacuum. The temperature and atmosphere pressure can be constant throughout sintering, or one or both can be varied or controlled as desired throughout the sintering process. Sintering can be for any time sufficient to form a sintered valve metal material, for example, from about 1 minute to about 50 hours, such as about 1 minute to about 36 hours, and preferably from about 10 minutes to about 10 hours.

According to one embodiment of the present invention, the starting valve metal is sintered in the presence of at least one iodine source. The iodine source can be any source suitable for forming a valve metal-iodine compound, for instance, tantalum iodide (e.g., $TaI_5$) or niobium iodide (e.g., $NbI_5$). For example, the iodine source can be elemental iodine, iodine in the solid, liquid, and/or gas phase, or an iodine compound. The iodine source can react with the valve metal to form a valve metal-iodine compound that acts as a sintering aid or reagent. Preferably, the sinter aid promotes the sintering mechanisms, surface diffusion, and/or evaporation/condensation. An exemplary reaction can be represented as:

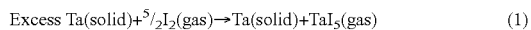

Excess $Ta(solid) + {}^5/_2 I_2(gas) \rightarrow Ta(solid) + TaI_5(gas)$     (1)

It is understood that after $TaI_5$ forms according to Eq. 1, preferably Ta and $TaI_5$ are present in appreciable equilibrium amounts. The dynamic equilibrium between the Ta metal and the $TaI_5$ gas can give rise to the preferred sintering mechanisms (i.e., surface diffusion and evaporation-condensation): $TaI_5$ condenses at identically the same rate that it evaporates, such that no net consumption of Ta metal or $TaI_5$ results. However, valve metal material can be transported by surface diffusion of iodine atoms, with the principal driving force being the difference in surface stress for Ta in various regions. As a result, the necks between particles fills in.

According to one embodiment of the present invention, sintering is performed in a vacuum furnace or furnace that can be evacuated or a reactor. The vacuum furnace can include an isolatable trap such that the contents of the trap can be introduced into the furnace, and/or the contents of the furnace can be introduced into the trap. Preferably, the contents of the trap can be isolated from the contents of the furnace, for example, by an operable valve disposed between the furnace and the trap. In one embodiment, the iodine source is contained in the isolatable trap, and controllably released therefrom and introduced into the furnace during any stage of sintering of the valve metal in the furnace. In another embodiment, all or any portion of the valve metal-compound formed during sintering is collected in the isolatable trap for reuse, for example, in subsequent sintering. Any method can be used to collect the valve metal-compound in the trap, for example, by controlling the temperature of the trap such that it acts as a cold trap, whereby the valve metal-compound can condense within the trap.

According to one embodiment of the present invention, the valve metal is subject to deoxidizing, for instance, within the same heat-treating device or furnace used to sinter the valve metal material. In general, the deoxidizing can include the steps of heat-treating the valve metal in the presence of a getter material, which preferably is a magnesium material or other getter material depending on the valve metal being deoxidized for a sufficient time and at a sufficient temperature to form a deoxidized valve metal material (e.g., less than 8,000 ppm oxygen in the valve metal).

The getter material for purposes of the present invention is any material capable of removing oxygen from the valve metal. Preferably, the getter material has an initial oxygen concentration that is lower than that of the valve metal. The getter material can be in any shape or size. For instance, the getter material can be in any physical form such as solid, liquid, or gas. The getter material can be in the form of a gas that can react with other materials, and more preferably, can react with iodine to form an iodide compound. Accordingly, the getter material can be, but is not limited to, tantalum, niobium, metal oxides, magnesium, sodium, potassium, combinations and alloys of the same, and the like, and is preferably magnesium, and more preferably $MgI_2$. The getter material can contain other getter materials and/or other constituents. Generally, a sufficient amount of oxygen getter material is present to at least decrease the amount of oxygen in the valve metal being deoxidized.

Deoxidizing of the valve metal in the presence of the getter material is at a sufficient temperature and for a sufficient time to form a valve metal with reduced oxygen content. The temperature and time of the deoxidizing can depend on a variety of factors such as the amount and the type of getter material used, the deoxidizing temperature and pressure, as well as the type of starting valve metal. The deoxidizing can be at any temperature which permits the deoxidizing of the valve metal and which is below the melting point of the valve metal being deoxidized. The deoxidizing of the starting valve metal can be at a temperature of from about 450° C. or less to about 1200° C. or more, and preferably from 450 to about 900° C. Deoxidizing can occur in an atmosphere which permits the transfer of oxygen atoms from the valve metal to the getter material. Deoxidizing can be for any amount of time, for example, from about 1 minute to about 50 hours, such as 1 minute to 30 hours.

According to one embodiment of the present invention, the heat treatment device used for sintering the valve metal includes an isolatable addition system such that the contents of the addition system can be introduced into the furnace, and/or the vapor contents of the furnace can be introduced into the addition system. Preferably, the contents of the addition system can be isolated from the contents of the furnace, for example, by an operable valve disposed between the furnace and the addition system. In one embodiment, the oxygen getter or deoxidizing agent is contained in the addition system, and controllably released therefrom and introduced into the furnace during any stage of deoxidizing or sintering of the valve metal in the furnace.

In one embodiment of the present invention, the oxygen getter can be for example, magnesium or magnesium with $MgI_2$ and/or magnesium iodide. Where $MgI_2$ in combination with Mg is used as the oxygen getter, $MgI_2$ acts at least as a sinter aid in the sintering of the valve metal. An exemplary cyclic reaction sequence can be represented as:

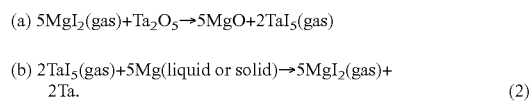

(a) $5MgI_2(gas) + Ta_2O_5 \rightarrow 5MgO + 2TaI_5(gas)$ (b) $2TaI_5(gas) + 5Mg(\text{liquid or solid}) \rightarrow 5MgI_2(gas) + 2Ta.$     (2)

In step b, the $MgI_2(gas)$ produced can react further with any remaining $Ta_2O_5$. Other similar reactions can occur.

Referring to FIG. 1, one possible sequence of the steps of the method of one embodiment of the present invention includes placing the starting valve metal, for example, tantalum metal in the heat treatment device, for example, a furnace 10. The iodine source is placed in the trap 20 which is connected by a conducting line to the furnace 10. The trap 20 is isolated from the furnace 10 by an in-line valve 25. The oxygen getter, for example, magnesium is placed in the addition system 30 which is connected by a conducting line to the furnace 10. The addition system 30 is isolated from the furnace 10 by an in-line valve 35. The trap 20 and the addition system 30 are evacuated. The furnace 10 is evacuated via a line connected to a vacuum pump (not shown). The furnace 10 is isolated from the vacuum by an in-line valve 15. The valve 25 to the trap 20 is controllably opened and a regulated amount of iodine is introduced to the valve metal in the furnace 10. The furnace is heated to about 450° C., for about 8 (more or less) hours, during which time finely controlled sintering of the valve metal occurs, and a sintering aid, $TaI_5$ for instance, is formed in the process. The temperature of the trap 20 is reduced, causing at least some of the $TaI_5$ to collect therein. The collected $TaI_5$ can optionally be reused in subsequent sintering. The valve 25 to the trap is closed, thereby isolating the trap 20 and its contents. The valve 35 to the addition system is controllably opened and a regulated amount of magnesium or other oxygen getter is introduced to the valve metal in the furnace 10. The furnace is heated to a temperature of about 850° C. for a time of from about 1 to about 10 hours or more, during which time the sintered valve metal is at least partially deoxidized, thereby forming a deoxidized sintered valve metal material having comparatively large pore size as well as other desirable properties from which high capacitance, low leakage capacitors can be made. The present invention preferably provides improved pore structure which leads to better or improved impregnation for capacitor formation, and can also lead to improved lower leakage and/or higher capacitance.

In another embodiment of the present invention, the present invention involves a method of making a capacitor anode which involves pressing a basic lot valve metal powder into a green anode and sintering the green anode to form a capacitor anode. In this process, there is no separate deoxidation step and no heat treating of the basic lot valve metal powder prior to pressing into the green anode. Thus, in this embodiment, the method of making the capacitor anode is extremely simplified and yet results in an acceptable anode having preferably low leakage and suitable capacitance. By avoiding certain steps like a separate deoxidation step and/or a separate heat treating of the basic lot valve metal powder, the method of making a capacitor anode by this method not only is cost effective but further simplifies the entire manufacturing process. For purposes of the present invention, the term green anode and basic lot powder are understood by those skilled in the art. Essentially, a green anode is a powder which is pressed into an anode but not sintered. A basic lot valve metal powder is a powder that is produced, for instance, from a sodium reduction or other methods without any other thermal processing step (such as heat treat or deox steps) to make a finished lot powder. Basic lot powder can include water agglomeration or other non-thermal agglomeration steps such as described in U.S. Pat. No. 6,576,038, incorporated by reference herein.

For purposes of the present invention, the valve metal powder, such as tantalum or niobium can be any type of powder, such as commercially available powder, such as from Cabot Corporation. The valve metal powder that is used in the present invention can have any physical and/or chemical properties, and can be nitrogen doped or can have other dopants and can have low or high oxygen levels. The metal can have any purity and preferably 99.95% or higher. For instance, the valve metal powder can have any BET such as from about 0.1 $m^2/g$ to about 10 $m^2/g$, any Scott Density, such as from about 10 $g/in^3$ to about 40 $g/in^3$, any particle size such as from about 30 nm to about 10 microns, any agglomerate size or granular size such as from about 0.1 micron to about 1,000 microns; any pore size distribution such as pore sizes of from 0.0001 to about 50 microns, and/or a tantalum flow of 70 m/g to about 300 m/g (as determined by the flow test in U.S. Pat. No. 6,576,038. The present invention is essentially capable of taking these various powders whether commercially available, or not, or future powders and provide a way to form an anode which has the ability to increase the capacitance and/or lower the DC leakage which would not normally be capable using conventional processing methods. Thus, the present invention has the ability to increase the capacitance and/or lower the DC leakage of valve metal powder when formed into an anode.

With respect to the valve metal powders, the present invention further relates to a valve metal powder wherein when the valve metal powder is sintered at 800° C. for 6 hours and formed into an anode, using a formation voltage of 60 volts and a formation temperature of 83° C., has a capacitance that is at least 20% greater than the same powder being tested and formed into an anode by sintering at 1400° C. for 10 minutes at the same formation voltage and same formation temperature. Thus, the present invention as indicated above has the ability to increase or maximize the capacitance capability of valve metal powders using the techniques, for instance, of the present invention. The increase in capacitance can be at least 30% greater when sintered at 800° C., at least 40% greater when sintered at 800° C., at least 20% to about 70% greater when sintered at 800° C., or can be from about 40% to about 60% greater when sintered at 800° C.

In addition, besides the increase in capacitance when sintered at 800° C., the valve metal powder can further have a DC leakage (after charging at 42 volts for 30 seconds), when sintered at 800° C. and formed into an anode, of 2.0 nA/CV or less or 1.0 nA/CV or less, or 0.75 nA/CV or less, or 0.5 nA/CV or less, or 0.4 nA/CV or less or have a DC leakage of from about 0.2 to about 1.0 nA/CV when the metal powder is sintered at 800° C. and formed into an anode. As indicated, the valve metal powder is preferably niobium, tantalum, or a combination thereof.

In a further embodiment of the present invention, the present invention relates to a valve metal powder wherein when sintered at 800° C. for 6 hours and formed into an anode with a formation voltage of 60 volts and a formation temperature of 83° C., has a DC leakage that is at least 20% lower than the DC leakage obtained when the same powder is formed into an anode sintered at a temperature of 1400° C. for 10 minutes at the same formation temperature and same formation voltage. This DC leakage can be at least 30% lower when sintered at 800° C., at least 40% lower when sintered at a temperature of 800° C., at least 50% lower when sintered at a temperature of 800° C., or the DC leakage can be lowered in amount of from about 20% to about 70% when sintered at 800° C.

In a further embodiment of the present invention, the present invention provides a sintered valve metal body having a shrinkage diameter of 0.5% or less. The shrinkage diameter is determined by comparing the measured diameter of the pressed green anode prior to any sintering and then measuring the diameter after the anode is sintered. The difference is the shrinkage diameter. In other words, the shrinkage diameter (e.g., with a press density of 5.5 g/cc) measures the decrease in diameter from sintering. If a shrinkage diameter is a negative number, this actually means that there was no shrinkage and that the sintered body actually swelled or increased in diameter. A low shrinkage diameter or a diameter that actually swells upon sintering is quite beneficial to the industry since many physical and electrical properties are maintained with less shrinkage. In the present invention, a preferred sintered valve metal body has a shrinkage of 0.25% or less, a shrinkage of about 0% or less, a shrinkage of –0.5% or less, a shrinkage of –0.75% or less (–0.75% to –5.0%), or a shrinkage of from 0.5% to –1.0%. Again, a negative number denotes zero shrinkage and an actual swelling of the valve metal body upon sintering. In these embodiments, the sintered valve metal body besides having a low or no shrinkage diameter, further has a DC leakage of 2.0 nA/CV or less when formed into an anode with a formation voltage of 60 volts and a formation temperature of 83° C. This DC leakage can preferably be 1.0 nA/CV or less, 0.75 nA/CV or less, and the like. In addition, this same sintered valve metal body which has a low or no shrinkage diameter can have a capacitance of at least 30,000 CV/g under the same testing conditions and, for instance, can have a capacitance of from 30,000 CV/g to 250,000 CV/g or more.

In another embodiment of the present invention, a sintered valve metal body can be prepared in the present invention. This sintered valve metal body, when sintered and formed into an anode by sintering at 800° C. for 6 hours has a DC leakage of 2.0 nA/CV or less using a formation voltage of 60 volts and a formation temperature of 83° C. Preferably, the DC leakage in this embodiment is 1.0 nA/CV or less, 0.5 nA/CV or less, and the like.

In a further embodiment of the present invention, a sintered valve metal body can be prepared which, when formed into an anode by sintering at 800° C. for 6 hours with a formation voltage of 60 volts and a formation temperature of 83° C. has a capacitance of at least 40,000 CV/g. Preferably this capacitance is from 40,000 to about 250,000 CV/g.

According to one embodiment of the present invention, the sintered valve metal material produced is used to form a capacitor. For instance, the valve metal can be sintered and/or deoxidized as described herein and then anodized, impregnated, and like to form a capacitor anode for a capacitor. The sintering and/or deoxidizing of the present invention can occur before and/or after any anodizing of the valve metal. The capacitor can be formed by any method, for example, as described in U.S. Pat. Nos. 6,527,937 B2; 6,462,934 B2; 6,420,043 B1; 6,375,704 B1; 6,338,816 B1; 6,322,912 B1; 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference. It is believed that capacitors made from the sintered valve metal material produced according to the present invention have improved lower electrical leakage characteristics. The capacitors of the present invention can be used in a variety of end uses such as automotive electronics; cellular phones; computers, such as monitors, mother boards, and the like; consumer electronics including TVs and CRTs; printers/copiers; power supplies; modems; computer notebooks; and disk drives.

The conventional treatment process for capacitance grade powders, after a basic powder is produced, generally follows a furnace treatment sequence involving high to very high temperature processes, such as, Basic powder production ⟶ Heat treat ⟶ deoxidation ⟶ press green anodes ⟶ sinter ⟶ anode.

Temperatures for the heat treat and sinter steps are generally on the order of 1300 C, and temperatures for deoxidation are generally on the order of 900 C. The thermal processing sequence given above also generally includes acid-washing, water-washing, and drying steps that may be applied at any stage for purification. There may also be a second deoxidation step depending on the powder, and a deoxidation step after sintering by some manufacturers.

In the example given below, the thermal history is abbreviated to include only one furnace treatment at moderate to high temperature:

Basic powder production ⟶ press green anodes ⟶ heat treat/sinter ⟶ anode.

The example described here demonstrates
1. that low temperature sintering is possible,
2. that the extent of heat-treatment or sintering can be limited to the initial stages of sintering that primarily involve surface transport phenomena,
3. that anodes can be prepared directly from basic powder,
4. that the process may also be applied to powder as well as pressed compacts because the chemistry is the same,
5. that the novelty of the process offers unusual flexibility in the manufacture of powder and anodes.

In view of items 4 and 5 above, an alternate process sequence, for example,

Basic powder production ⟶ heat treat ⟶ finished powder for anode manufacturer, gives as a final product the powder that will be compacted and formed by the end user or capacitor manufacturer.

The example described herein uses the co-presence of $MgI_2$ and $TaI_5$ to allow and to promote surface transport during the heat treatment/sintering at unusually low temperatures. A small amount of magnesium metal is added for deoxidation of the powder. Perhaps more importantly, the magnesium metal assists sintering of tantalum because it reacts with the passive layer of $Ta_2O_5$ on the powder, according to Equation 2, thereby exposing tantalum metal to the iodine-bearing vapor, which is beneficial to the evaporation-condensation mechanism (FIG. 2.)

Ordinarily, for significant solid-state sintering to occur, temperatures on the order of half the melting point (using the Kelvin temperature scale) are required. For example, a typical solid-state sintering cycle for Ta, with a particle diameter on the order of 0.7 microns, would be carried out at approximately 1750 K (1480 C) for thirty minutes. The melting point of tantalum is approximately 3270 K (2996 C). Furnace times on the order of several hours or days may be required, depending on how close the temperature is to the melting point. For example, shorter times can be used as the temperature nears the solidus for the reaction or nears the melting point of a pure material.

In consideration of temperature, it is the ratio of absolute (Kelvin scale) temperatures that is important, not the differences in temperature. For example, the temperature "step from 1 K to 0.001 K is just as significant as the step from 1000 K to 1 K." Consequently, a low-temperature sintering route was sought that gives coarsening without densification, confining the sinter process to the initial stages and to surface transport, as opposed to bulk transport, thereby preserving surface area and increasing capacitance of the powder or pressed compact (anode). For this reason, temperatures for heat treat and sintering were sought that were much lower. For example a furnace temperature on the order of 600-800 C (873-1073 K) is one-fourth of the melting point of tantalum, as compared to the typical furnace temperatures for heat treat and sintering, which are typically on the order of one-half of the melting point. To this end, the evaporation-condensation mechanism was employed using iodine-bearing vapors for surface transport.

The present invention will be further clarified by the following examples, which are intended to be exemplary of the present invention.

EXAMPLES

Example 1

Four nickel crucibles were charged with materials for heat treatment. Each crucible was loaded with the same materials: 6 tantalum pressed compacts or green anodes (suspended from a nickel holder); 1 g of tantalum powder; 0.024 g of magnesium metal; and 0.09 g of $MgI_2$. The anodes and powder originated from basic lot HP500 material (232168-002). The anodes were pressed to a density of 5.5 g/cc with a diameter of 0.150 inches and a length of 0.188 inches.

The $MgI_2$ was loaded into the crucible under inert atmosphere, i.e., in an argon glove-box. While still under inert atmosphere, a nickel tube was welded onto a nickel lid, and the tube/lid assembly was welded to the each crucible previously charged with materials. A valve was attached to the tubing and closed prior to removing the crucible from the glove box, which minimized or avoided exposure of the contents to ambient atmosphere. The valve was connected to vacuum, then opened, and the crucible was evacuated to less than $5 \times 10^{-5}$ torr. The crucible was then isolated under vacuum by pinching and heating (with a torch) the nickel tubing at a point between the crucible and the valve. Four crucibles thus assembled were heat treated according to the temperatures and times listed in Table I.

After heat treatment, each crucible was cut open, under argon atmosphere, and loaded into a chamber with valves for vacuum and air. The material contents of the open crucibles were then passivated by evacuating the chamber, admitting air, and repeating until sufficient air had been admitted to passivate the materials. During the passivation process, oxygen in the air reacts with any fresh tantalum metal on the surface of the material, giving a passivated layer of $Ta_2O_5$ on the surface.

After passivation, the anodes were soaked in an ice-cold aqueous solution of $H_2O_2$ and $HNO_3$. The solution was prepared by adding 1.5 mL $HNO_3$ (concentrated) and 1.5 mL $H_2O_2$ (30%) to 250 mL crushed ice with water to a total volume of 200 mL. The anodes were soaked for approximately 30 minutes, rinsed with deionized water, soaked in deionized, and rinsed again. They were then air-dryed on a Kimwipe and submitted for the wet capacitance testing. This wet capacitance portion of the procedure is identical to the procedure ordinarily used for this basic lot powder, after all of the usual powder finishing steps. A standard lot powder (C515-C-8732) was submitted for comparison. The wet capacitance test for the anodes of comparison and the anodes of the present invention was the same. The starting materials were the same for the comparison and the present invention. The "standard" tantalum powder was conventionally prepared with a heat treat, a deox, and ultimately pressed and sintered. The results in Table I represent an average of 8 anodes for the standard lot powder and an average of two anodes for each crucible A and B.

Results Summary

Compared to typical sinter temperatures (e.g., 1750 K or 1480 C), the sinter, or heat-treatment temperature, for crucible B was low at 1073 K (60% of the typical sinter temperature, and 33% of the melting point). In consideration of anodes from crucibles A and B, the anode from crucible A was the most difficult to grind. When grinding the anode from crucible A in preparation for SEM examination, it behaved like solid tantalum metal despite the low furnace temperature.

The trend in the extent of sintering was visibly evident with respect to the wire in the center of the pressed powder of the anode. After cross-sectioning the anodes, the boundary between the wire and the pressed powder was visibly evident for the anode from crucible B. For the anode from crucible A, the boundary between the wire and the pressed powder was not visible to the naked eye; however, the boundary was visible under SEM examination.

Comparing anode results (Table I) for crucibles A and B to the standard anode results, there is clearly a 40% increase in usable surface area as judged by the corresponding increased capacitance with comparable or improved leakage (i.e., DCL). Comparing anode results for crucibles A and B to each other, the process was limited to initial stage sintering because the capacitance was the same despite the large difference in times. The extent of sintering and reduction in surface area reached its limit. At higher furnace temperatures, bulk transport will begin to have more of an effect, and differences in capacitance for the two times, 6 and 22 hours, will become apparent. Shorter times may then be used. For example, at 900 C, times of 1 and 4 hours may be used to yield a negligible difference in capacitance for the two times.

The lower leakage for crucible A anodes compared to B anodes is readily explained by enhanced release, or ease of release, of impurities (e.g., MgO, $MgI_2$) from the anodes. For example, impurities would be more uniformly distributed (equilibrated) at longer times. The SEM micrographs support this with regard to the coloration of the rinds (outer surfaces) of the anodes. For the anode from crucible A, the existence of any rind was least pronounced. Here again, higher temperatures and shorter times may be used to advantage. For example, at 900° C., times of 1 and 4 hours may be used to yield only a slight difference in leakage for the two times.

Besides the increased capacitance for the crucible A anodes as compared to the standard anodes, the low shrinkage also demonstrates that surface area was preserved, and the sintering mechanism was limited to surface transport. For the crucible A anodes, the shrinkage was less than that for the standard powder anodes; and the crucible A anode had good mechanical integrity and a good bond between the pressed compact and the wire, as reported by the independent SEM analysis. In the case of anodes from crucible B, the shrinkage was negative, indicating a swelling of the anodes. This can occur when pores grow and is substantive evidence of coarsening; in fact, the anode was less dense than the green pressed compact.

Additional Ta anodes sintered at 600° C. for 6 and 22 hours (but otherwise the same process as Anodes A and B) also exhibited swelling of the anode, such as a swelling diameter of greater than 0.5% (e.g., a swelling of 1.0% and 1.37%).

Thermodynamic calculations show that by increasing the temperature from 600 C to 800 C, the vapor pressures of both $MgI_2$ and $TaI_5$ increase significantly. For example, in one system the vapor pressure of $MgI_2$ increased from 0.0026 atm to 0.27 atm while the vapor pressure of $TaI_5$ increased from 0.0038 to 0.15 atm. Since these are the active vapor species in the evaporation-condensation mechanism, their increased presence (vapor pressure) enhances the rate of sintering by this mechanism. Conversely, lower pressures lessen the extent of sintering by this mechanism.

TABLE 1

Summary of Heat Treat Conditions and Results

| Process | CV/g | DCL, nA/CV | Shrinkage, diam. |
|---|---|---|---|
| Standard | 37,000 | 0.47 | +2.3% |
| (Standard: Basic lot → heat treat → deox → press → sinter → anode) | | | |
| 800 C/22 h (Crucible D) | 53,000 | 0.39 | +1.00% |
| 800 C/6 h (Crucible B) | 53,000 | 0.61 | −0.73% |
| (Example of New Process: Basic lot → press → heat treat with $MgI_2$ & Mg → anode) | | | |

Test Conditions: After forming the anode, it was rinsed and dried at 100° C. for 30 minutes.
Dp = 5.5 g/cc
Vf = 60 volts
Formation temp = 83° C.
electrolyte (formed in 0.06% $H_3PO_4$ at 83° C.)
Capacitance Testing: 120 Hz, 2.5 Volts DC Bias, 18% $H_2SO_4$ at 21° C.
pellet size = 0.15 inches-dia, 0.19 inch length
Current Density: 337.5 milliAmps/g with a 5 hour hold.
DC Leakage Testing: After charging at 42 volts for 30 seconds, 10% $H_3PO_4$ at 21° C.

The following examples can also be conducted to show the benefits of the present invention.

Three scenarios can be examined. In the first scenario, a small amount of $MgI_2$ was used as the limiting reagent. In the second scenario, $MgI_2$ in an amount in excess of the $Ta_2O_5$ was used. In the third scenario, a small amount of $MgI_2$ (or $I_2$) was used in the presence of sufficient magnesium to perform the deoxidation.

In the first scenario, managing the furnace reactor volume so that the pressure was maintained less than 1 atmosphere was straightforward. With $MgI_2$ in excess of the $Ta_2O_5$ (second scenario), the $MgI_2$ became both the sinter aid and the deoxidizing reagent, however, and excess $MgI_2$ generated a large number of moles of gas that needed to be managed. With a small amount of $MgI_2$ (added as iodine to make $MgI_2$) and enough magnesium for deoxidation (third scenario), the gas volume (for 1 atm. pressure) was small, and sufficient $TaI_5$ was in the vapor for the covalent bond interactions that promote the evaporation/condensation sintering mechanism. Additionally, $MgI_2$ was in the vapor for promoting both the sintering and the deoxidation reactions.

In a comparison of the three scenarios, a batch size of 500 moles tantalum metal powder (about 200 lbs) with 10 moles of $Ta_2O_5$, surface film was examined. This batch composition corresponds to 8400 ppm oxygen.

Small Amount of $MgI_2$ (Limiting), Excess $Ta_2O_5$ (Scenario 1) Equilibrium calculations showed that the reaction between $MgI_2$ and $Ta_2O_5$ occurred in significant proportions at approximately 860° C., with 60% of the $MgI_2$ converted to MgO. At a 1:10 ratio of $MgI_2$:$Ta_2O_5$, only a small amount of the $Ta_2O_5$ was converted to $TaI_5$. This $TaI_5$ species and the unreacted $MgI_2$ (0.4 moles gas) were the principal components of the gas phase. The gas phase species were the sintering agents of the system, permitting evaporation-condensation and surface reorganization to occur.

At 860° C. and 1 atmosphere of pressure, the gas volume was 60 liters. Allowing for a temperature overrun to 100° C., the equilibrium gas volume was about 100 liters, equivalent to 3.53 $ft^3$, which produces a manageable reactor-furnace volume (a cube with an edge of 1.52 ft, or a sphere with a diameter of 1.9 ft.).

Since some of the $Ta_2O_5$ was converted to $TaI_5$, the oxygen contamination level was reduced. With equilibrium at 860° C., the oxygen contamination level was slightly less, approximately 8300 ppm (compared to the original 8400 ppm). After the $TaI_5$ and $MgI_2$ were evacuated to a cold trap, the oxygen contamination level was reduced further by addition of magnesium vapor, since the reactor furnace was configured to accommodate both the sintering and magnesium-deoxidation steps. It should be noted that the order of addition may be relevant. It may be desirable to add the magnesium and a small amount of iodine (0.5 mole or 127 g) at the same time, which is discussed below. An alternative, described below, is to add excess $MgI_2$, which will affect both sintering and deoxidation.

$MgI_2$ Excess, $Ta_2O_5$ Limiting (Scenario 2) Recognizing that the $MgI_2$ attacks the $Ta_2O_5$, the use of this reagent to act both as sintering and deoxidation agents was examined. For example, at a ratio of 3:1 (30 moles $MgI_2$), 3.7 moles of $Ta_2O_5$ were consumed at 860° C. (60% of the $MgI_2$ reacted). This lowered the oxygen contamination level from 8400 to approximately 5300 ppm. However, the gas volume needed to be large to maintain pressure below 1 atm. Allowing for a temperature overrun to 1000° C., the volume at 1 atmosphere of pressure in the reactor was 300 liters. Increased amounts of $MgI_2$ can be used to lower the oxygen contamination level further, but even larger volumes are required.

In this approach, the amount of gas evolved used a large furnace volume to keep the pressure below 1 atm. In addition, $MgI_2$ is expensive and difficult to acquire. However, the $MgI_2$ can be made in situ during the sintering operation. An alternative to a large furnace enclosure that accommodates the amount of gas generated is a feed and bleed approach to conducting the reaction. Alternatively, the sintering and deoxidation operations can be performed simultaneously as described below.

Small Amount of $MgI_2$ (Limiting) in the Presence of Mg for Deoxidation (Scenario 3) Calculations showed that an initial small amount of $MgI_2$ alternatively, (e.g., initially in the form of 0.5 moles $I_2$) in the presence of magnesium allowed the deoxidation steps to occur in the presence of $TaI_5$ and $MgI_2$ vapors. The gas phase species are preferable for promoting the sintering of the valve metal. However, compared to the second proposed example above, the amount of species in the gas phase was limited because of the small amount of iodine present. And compared to the first proposed example, sufficient magnesium was present to perform the deoxidation in the same operational step as sintering.

Due to the small amount of iodine present (0.5 moles), only a small volume was required to keep the furnace enclosure at a pressure less than 1 atm. This reactor volume is approximately 50 liters at 1000° C. Moreover, with such a large excess of magnesium and tantalum compared to iodine, the gas volume required to keep the pressure less than 1 atmosphere is independent of the amount of magnesium, i.e., for temperatures that keep vapor pressure of magnesium below approximately 50 torr.

It should be noted that the presence of the iodine is expected to improve not only sintering, but also deoxidation. The presence of the $MgI_2$ vapor facilitates deoxidation. In either of preferred scenarios 1 and 3 (i.e., limiting $MgI_2$ or excess $MgI_2$) of the present invention, reduced power consumption, labor and maintenance costs result, along with improved retention of pore volume and surface area of the sintered valve metal material.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of sintering a valve metal powder to form a porous bonded valve metal powder comprising sintering said valve metal powder in the presence of at least one iodine source to form said porous bonded valve metal powder, wherein said porous bonded valve metal powder has a shrinkage diameter of 0.5% or less.

2. The method of claim 1, wherein during said sintering, a valve metal-iodine compound temporarily forms.

3. The method of claim 1, wherein said iodine source is a gas.

4. The method of claim 1, wherein said iodine source is a liquid.

5. The method of claim 1, wherein said sintering occurs in a vacuum furnace or reactor.

6. The method of claim 1, wherein said sintering occurs in a vacuum furnace that has an isolatable trap.

7. The method of claim 2, further comprising collecting at least a portion of said valve metal-iodine compound in an isolatable trap for reuse.

8. The method of claim 1, wherein said valve metal powder is tantalum.

9. The method of claim 1, wherein said valve metal powder is niobium.

10. The method of claim 2, wherein said valve metal-iodine compound is tantalum iodide.

11. The method of claim 2, wherein said valve metal-iodine compound is $TaI_5$ or $NbI_5$.

12. The method of claim 1, wherein said sintering is at a temperature of less than about 1200° C.

13. The method of claim 1, wherein said sintering is at a temperature of from about 350 to about 900° C.

14. The method of claim 1, wherein said sintering is at a temperature of from about 450 to about 850° C.

15. The method of claim 1, wherein said sintering is at a temperature in which the predominate sintering mechanisms comprise surface diffusion and evaporation/condensation.

16. The method of claim 1, wherein said sintering is for a time of from about 10 minutes to about 50 hours.

17. The method of claim 2, wherein said valve metal powder and said valve metal-iodine compound are present in equilibrium.

18. The method of claim 5, wherein said vacuum furnace further comprises an isolatable addition system for containing an oxygen getter.

19. The method of claim 5, further comprising deoxidizing said valve metal within said vacuum furnace.

20. The method of claim 1, wherein at least one oxygen getter is present during said sintering.

21. The method of claim 20, wherein said oxygen getter comprises magnesium.

22. A method of sintering a valve metal comprising sintering said valve metal in the presence of at least one iodine source to form a sintered porous valve metal, and further comprising deoxidizing before, during, and/or after said sintering.

23. The method of claim 22, wherein said deoxidizing is a magnesium deoxidizing.

24. A method of forming a sintered valve metal powder, comprising:
    sintering a valve metal powder in the presence of an iodine source within a container to form a sintered porous valve metal powder; and
    deoxidizing said sintered porous valve metal powder in the presence of an oxygen getter within said container, wherein said valve metal powder is niobium or wherein said valve metal powder is tantalum powder having a BET of from about 0.1 $m^2$/g to about 10 $m^2$/g, a Scott density from about 10 g/$in^3$ to about 40 g/$in^3$, a particle size from about 30 nm to about 10 microns, and an agglomerate size of from about 0.1 micron to about 1,000 microns.

25. The method of claim 1, wherein said sintering occurs before any anodization

26. The method of claim 1, wherein said sintering occurs after at least one anodization.

27. A method of making a capacitor anode comprising sintering a valve metal powder in the presence of an iodine source to form a sintered porous bonded valve metal powder, and anodizing said sintered porous bonded valve metal powder to form said capacitor anode, wherein said valve metal powder is niobium or wherein said valve metal powder is tantalum powder having a BET of from about 0.1 $m^2$/g to about 10 $m^2$/g, a Scott density from about 10 g/$in^3$ to about 40 g/$in^3$, and a particle size from about 30 nm to about 10 microns.

28. The method of claim 1, wherein said valve metal powder is tantalum powder having a BET of from about 0.1 $m^2$/g, to about 10 $m^2$/g, a Scott density from about 10 g/$in^3$ to about 40 g/$in^3$, a particle size from about 30 nm to about 10 microns, an agglomerate size of from about 0.1 micron to about 1,000 microns, a pore size distribution of from 0.0001 to about 50 microns, and a tantalum flow of from 70 m/g to about 300 m/g.

29. The method of claim 1, wherein said porous bonded valve metal powder has a shrinkage of about 0%.

* * * * *